United States Patent [19]
Bunsen

[11] Patent Number: 5,260,886
[45] Date of Patent: Nov. 9, 1993

[54] DEFAULT DENOMINATOR FOR FRACTION ENTRY AND DISPLAY

[75] Inventor: Chris M. Bunsen, Corvallis, Oreg.

[73] Assignee: Hewlett-Packard Company, Palo Alto, Calif.

[21] Appl. No.: 736,350

[22] Filed: Jul. 26, 1991

[51] Int. Cl.⁵ .............................................. G06F 3/00
[52] U.S. Cl. ................................................ 364/709.07
[58] Field of Search ...................... 364/709.07, 709.01, 364/706

[56] References Cited

U.S. PATENT DOCUMENTS

| | | | |
|---|---|---|---|
| 4,081,859 | 3/1978 | Goldsamt et al. | 364/709.07 |
| 4,545,022 | 10/1985 | Hughins | 364/709.07 |
| 4,744,044 | 5/1988 | Stover et al. | 364/709.07 |
| 5,025,403 | 6/1991 | Stephens | 364/709.07 |
| 5,050,115 | 9/1991 | Matsuda et al. | 364/709.07 |
| 5,089,980 | 2/1992 | Bunsen | 364/709.07 |

FOREIGN PATENT DOCUMENTS 50-115061  3/1977  Japan .............................. 364/709.07

Primary Examiner—Long T. Nguyen

[57] ABSTRACT

In a calculator, apparatus and method for supplying a default denominator for entering and displaying fractions. A default value is selected and stored with a simple procedure and may be retrieved for combination with a numerator value to create a fraction by a single key stroke.

5 Claims, 2 Drawing Sheets

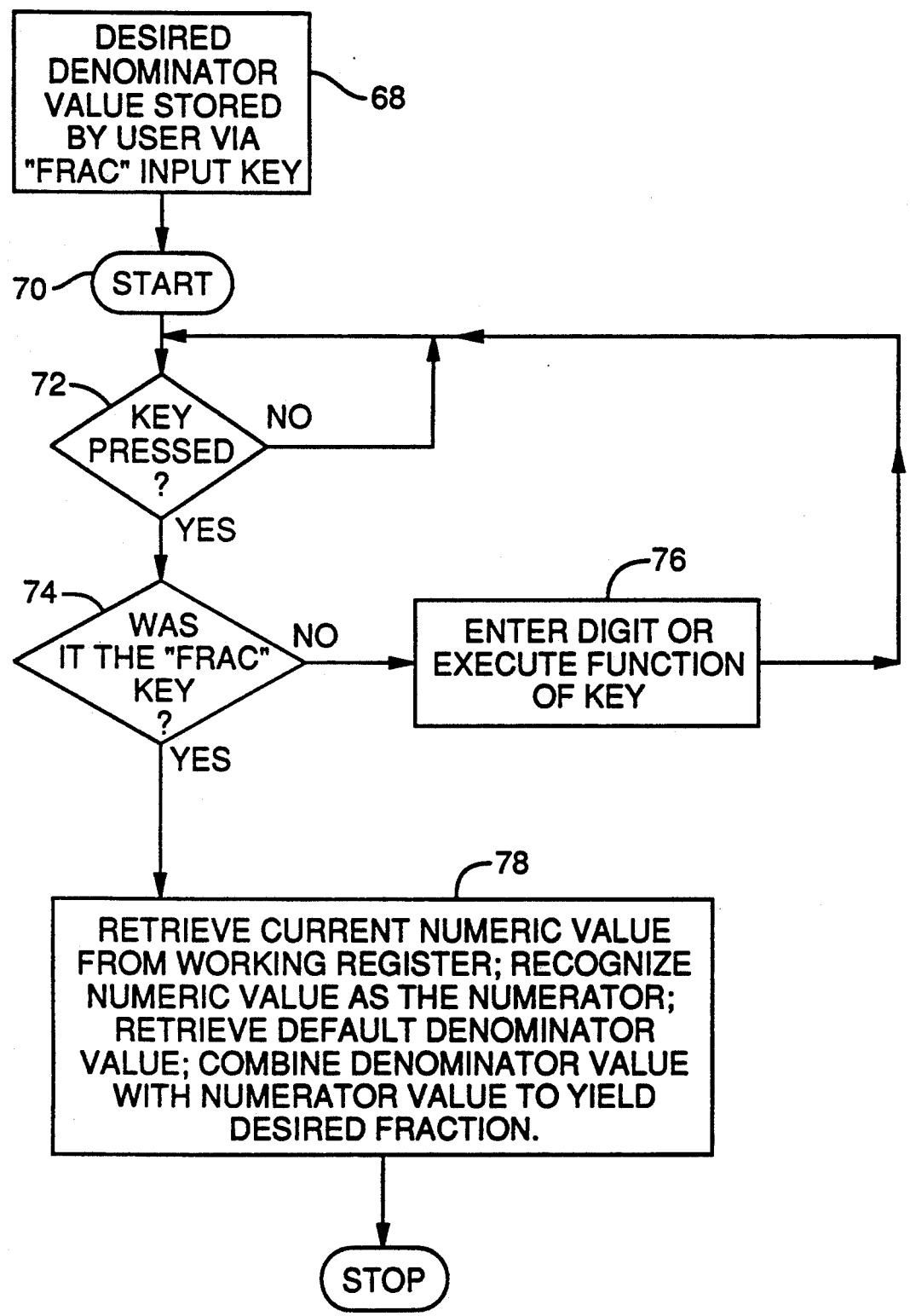

DEFAULT DENOMINATOR FOR FRACTION ENTRY AND DISPLAY

FIELD OF THE INVENTION

This invention relates to a method and apparatus for entering and displaying fractions in a calculator. More particularly, this invention relates to utilizing a stored, default denominator within the calculator for creating fractions with a single keystroke.

BACKGROUND AND SUMMARY OF THE INVENTION

Prior approaches to entering fractions into a calculator have relied upon the pressing of keys in predetermined patterns to indicate a characteristic or whole number part, a numerator, and a denominator. See, for example, the techniques described and shown in U.S. Pat. Nos. 5,089,980 to Bunsen et al. and 5,025,403 to Stephens and Japanese Patent Application No. 50-115061. Although these techniques work well for allowing a user to select different numerators and denominators, they require a relatively large number of keystrokes to enter a fraction into a calculator. Consequently the chance for error is greater and the user must proceed slower and more cautiously than he might otherwise desire.

In some circumstances, a user may wish to enter some data that share a first common denominator and other data that share a second common denominator. For example, the user may need to enter some measurements in thirds and other measurements in fourths. Using the prior techniques described above requires the user to repeat the same keystroke patterns over and over again. Yet utilizing a dedicated fraction key such as disclosed in U.S. Pat. No. 4,081,859 is not a solution. Dedicated fraction keys are limited to entering only predefined fractions. Given the limited area on the keyboard of a calculator, only a few of such keys may be supplied.

The invention overcomes the drawbacks of these prior techniques by allowing a user to store any denominator value as a default value and then select it for use in a fraction with only a single keystroke.

BRIEF DESCRIPTION OF THE DRAWINGS

FIG. 3 shows a flow chart of the steps employed by the calculator for entering fractions in accordance with the invention.

DETAILED DESCRIPTION OF A PREFERRED EMBODIMENT

The Apparatus

Figure 1:
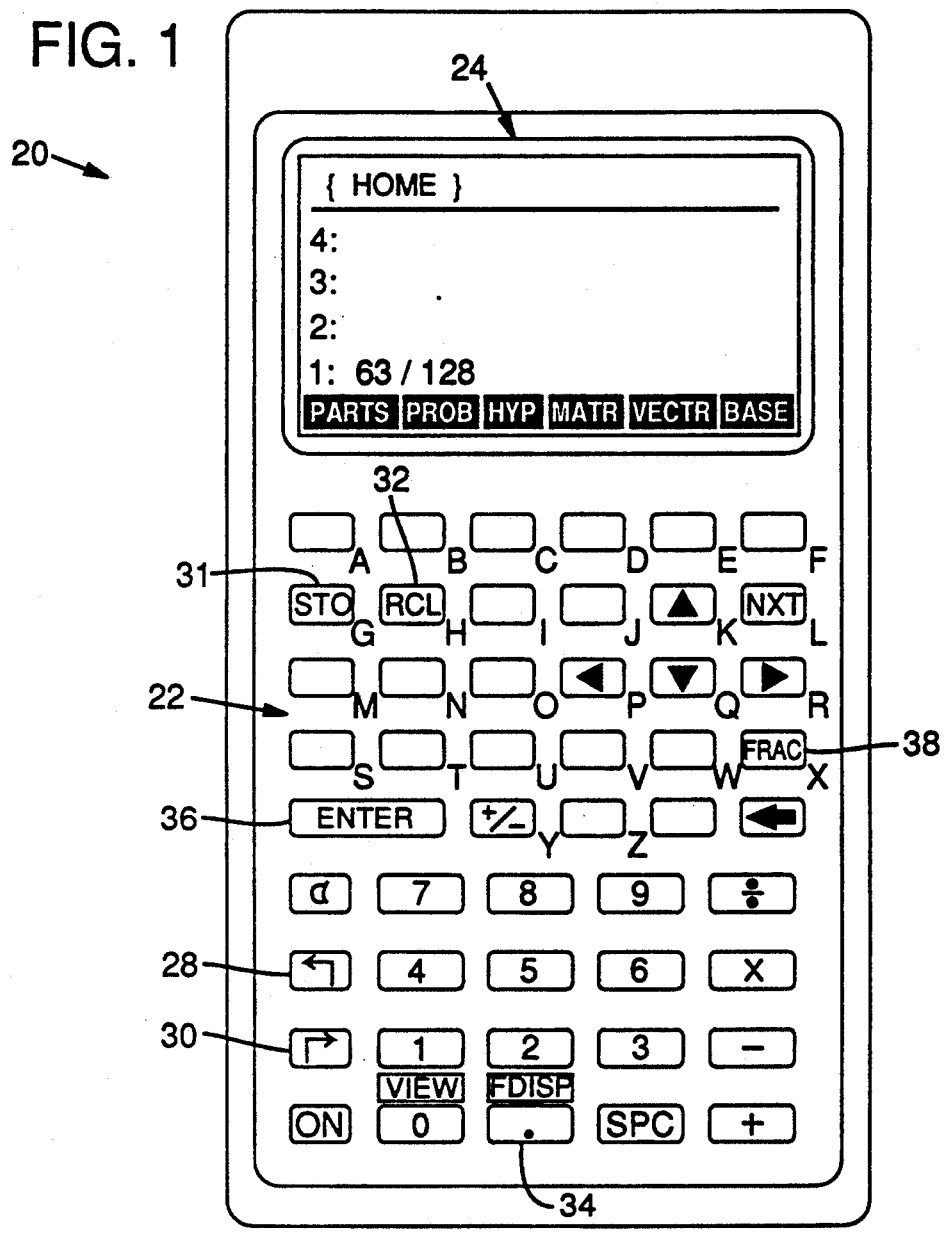
FIG. 1 shows the keyboard and display of a calculator in accordance with the invention.

FIG. 1 shows a typical hand held calculator 20 for use with the present invention. The hardware and architecture of the calculator 20 (shown in FIG. 2) may be of conventional design. The calculator includes a data entry means such as a keyboard 22 and a display means such as an LCD display 24. On the face of the keyboard 22 are a plurality of keys that each have a number of functions. The function of a key depends on whether the left shift key 28 or right shift key 30 is pressed before the desired key, as is commonly done in calculators. The primary function appearing on the face of the key is executed if neither shift key is pressed immediately beforehand. Keys of relevance to the present invention include a STO key 31 for storing a value in memory under a variable name; a RCL key 32 for recalling the variable value for display; a 0 digit key that has a shifted function VIEW; a decimal point key 34 that has a shifted function FDISP; an ENTER key 36 for entering a value into the calculator 20; and a FRAC key 38 for storing and retrieving a desired denominator. The function of key 38 is explained more fully below.

Figure 2:
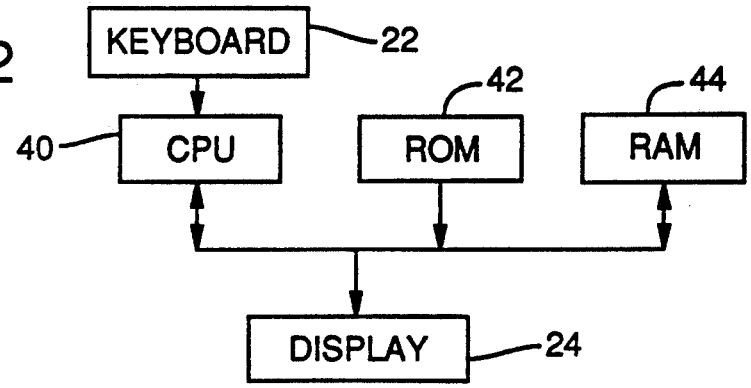
FIG. 2 shows the internal architecture of the calculator of FIG. 1.

Referring to FIG. 2, the architecture of calculator 20 includes a central processing unit (CPU) 40 to which are connected via various buses the keyboard 22, the display 24 and memory in the form of ROM 42 and RAM 44. The instructions for operating CPU 40 are written to and stored in ROM 42 or equivalent memory in a conventional manner. RAM 44 is available for storing data entered via the keyboard 22 and generated by CPU 40 in the process of performing computations. Several registers including flag registers and memory stack registers (not shown) are also typically provided.

It will be understood that calculators equivalent to this embodiment may be employed with the invention. Equivalent to the keyboard would be any data entry device such as a mouse. Equivalent to the LCD display would be a display such as a CRT or hard copy device.

The Method

When the calculator 20 is initially energized, CPU 40 causes numeric values entered via the digit keys 0–9 to be displayed in decimal format. The decimal display mode is the default display made. When the user desires to implement mathematical equations incorporating fractions having a numerator and a denominator, CPU 40 can be reset to a fraction display mode. This is accomplished by pressing key sequence 28 and 34 to execute the shifted function FDISP which displays a number as a fraction. This key sequence switches between fraction display mode and the default decimal display mode. Even in the fraction display mode, however, numbers are evaluated internally as decimal numbers, then displayed on display 24 as fractions. To return to a decimal display mode, the ENTER key 36, key 28, and key 34 are pressed in sequence.

FIG. 3 shows a flowchart of the steps undertaken by CPU 40 for entering a fraction into calculator 20, with each step in the flowchart identified herein by a numeral in parentheses. Initially, the user must store a numeric value that is associated with FRAC key 38 (68). Although a number of methods are possible, a preferred way is to use the STO key 31 and RCL key 32 for storing and recalling the desired denominator. Referring again to FIG. 1, the desired denominator is entered into the calculator (as any value is) by first pressing the appropriate digit keys 0-9. The value is displayed as it is entered on the bottom line of display 24. If correct, the user may then store the value as the default denominator by pressing STO key 31 and then FRAC key 38 in sequence. This action stores the value under the FRAC variable for its retrieval as a denominator. To view the currently stored value, the user may press the RCL key 32 and then FRAC key 38 in sequence. This key action places the recalled value in the calculator's working (X) register and may thus affect other values stored there. Alternatively, calculator 20 may include a shifted function VIEW on a key such as the 0 key. VIEW is actuated by pressing shift key 30, the 0 key and then FRAC key 38 in sequence to view the stored denominator value without placing it in the working register.

On powering up the calculator 20, CPU 38 stores a default value of one for the FRAC key 38 in the event the user does not store a denominator therein before attempting to enter a fraction. It should also be emphasized that FRAC need not be a primary function, but could also be a shifted function that requires an initial press of a shift key 28 or 30.

With a default denominator stored (68), the user may proceed to enter a fraction by simply supplying a numerator value (70). CPU 40 checks continuously to determine if a key has been pressed (72). Once this event is detected, the CPU checks to see if the pressed key is FRAC key 38 (74). Assuming that a numerator value or a calculation to generate a numerator value is desired, the digit is first entered or the function executed (76). CPU 40 then looks for another key press (72). If it is the FRAC key 38 this time (74), CPU 40 combines the displayed numerator value with the stored default denominator value to yield the desired fraction (78). This step includes retrieving the current numeric value from the working register; recognizing the numeric value as the numerator value; retrieving the default denominator value; and combining the denominator value with the numerator value to yield the desired fraction. As described above, the fraction may be displayed in either fraction or decimal mode. If the user then desires to enter fractions with a different denominator, he need only change the default denominator value as described (68) and then enter a desired numerator value or a function for calculating a numerator value.

By way of example, refer to display 24 in FIG. 1. Assume that the current user-stored denominator is 128. To enter "63/128," the user enters "63" and then presses FRAC key 38. The display 24 shows the fraction "63/128" or the decimal "0.4921875," depending on the formatted display mode (either fraction display or decimal-display mode as selected by the user in the manner described).

Having described and illustrated the principles of the contemplated invention with reference to a preferred embodiment, it should be apparent to those skilled in the art that the invention can be modified in arrangement and detail without departing from such principles. I claim all such modifications coming within the scope and spirit of the following claims.

I claim:

1. A calculator comprising:
   (a) a display;
   (b) a keyboard having keys including digit keys for entering numeric values and a function key; and
   (c) a processor for:
      storing, upon pressing one or more digit keys and then the function key, a numeric value as a default denominator for use in providing fractions;
      displaying on the display, in response to pressing one or more digit keys, an entered numeric value as a numerator for a fraction; and
      providing, upon pressing of the function key, a fraction having the entered numerator and default denominator values.

2. The calculator of claim 1 wherein the processor displays the stored fraction with the numerator and default denominator.

3. The calculator of claim 1 wherein the processor displays the stored fraction as a decimal value.

4. In a calculator, a method of entering a fraction, comprising;
   pressing one or more digit keys to enter a first numeric value into the calculator;
   storing, in response to the pressing of a key, the first numeric value as a default denominator;
   entering a second numeric value;
   in response to a press of a function key, recognizing the second numeric value as a numerator value and combining the numerator value with the default denominator value to produce a fraction; and
   displaying the fraction with a numerator and denominator.

5. In a calculator, a method of entering a fraction, comprising;
   pressing one or more digit keys to enter a numeric value into the calculator;
   storing, in response to the pressing of a function key, the numeric value as a default denominator value; and
   providing the default denominator value for a fraction in response to pressing of the function key.

* * * * *